May 20, 1952  W. F. SIMPSON  2,597,268
MACHINE FOR ANGULARLY GUIDING
AND MOUNTING TIRES ON WHEELS
Filed Dec. 19, 1947  7 Sheets-Sheet 1

INVENTOR.
William F. Simpson
BY Walter W. Burns
Attorney

INVENTOR.
William F. Simpson
BY Walter W. Burns
Attorney

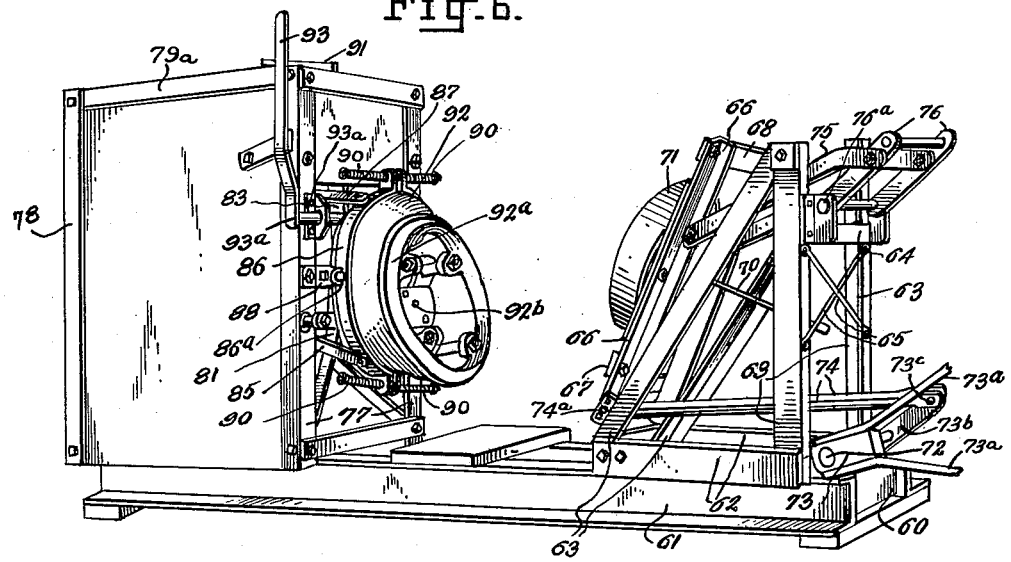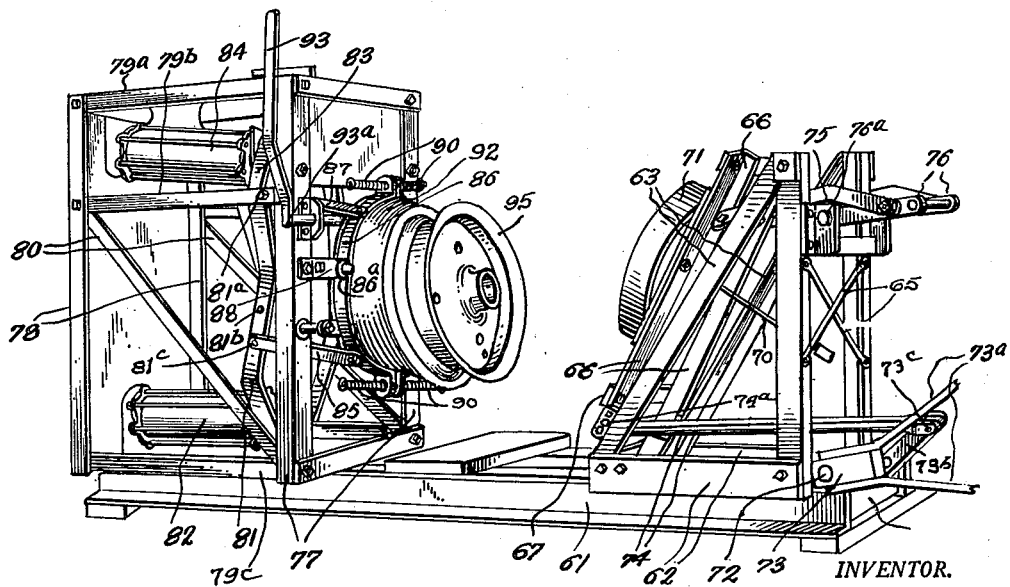

INVENTOR.
William F. Simpson
BY Walter W. Burns
Attorney

May 20, 1952 W. F. SIMPSON 2,597,268
MACHINE FOR ANGULARLY GUIDING
AND MOUNTING TIRES ON WHEELS
Filed Dec. 19, 1947 7 Sheets-Sheet 5
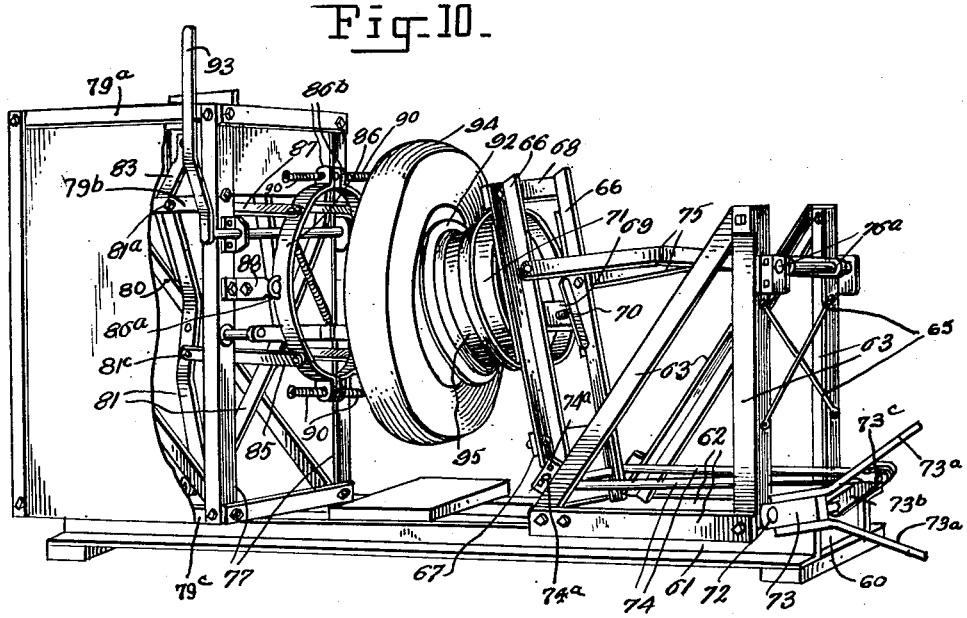
INVENTOR.
William F. Simpson
BY Walter W. Burns
Attorney INVENTOR.
William F. Simpson
BY Walter W. Burns
Attorney

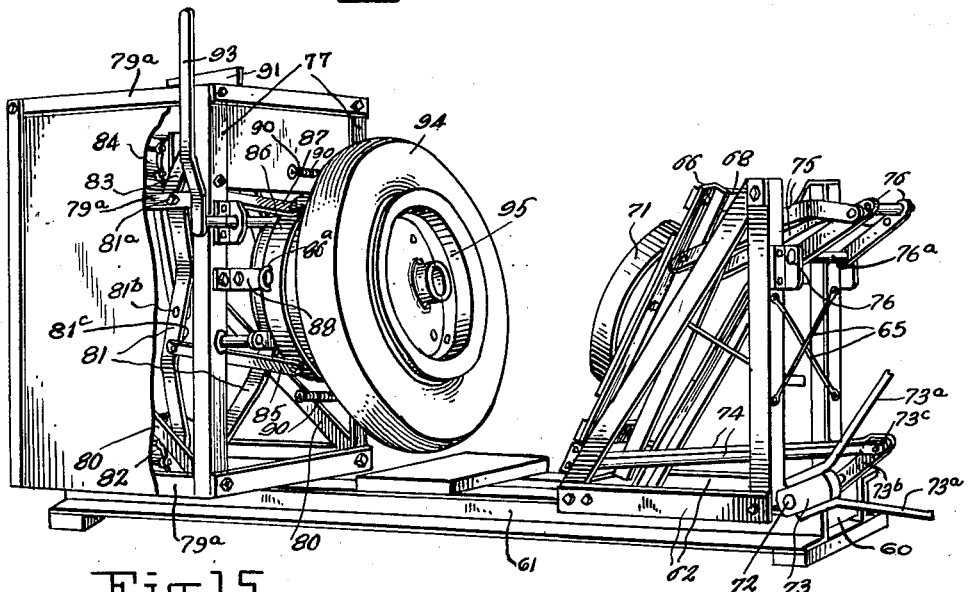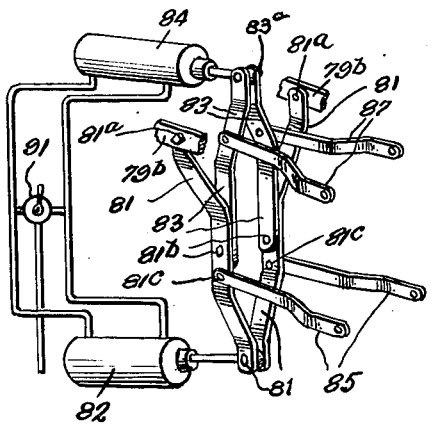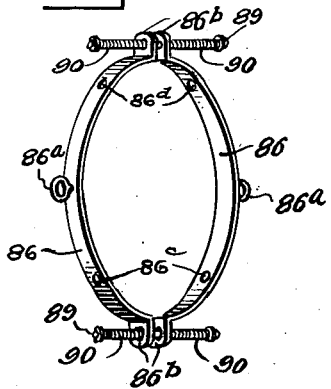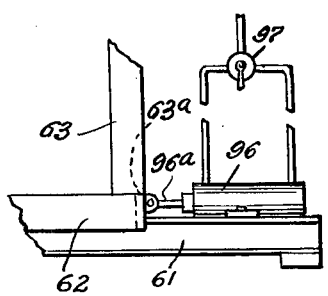

Patented May 20, 1952

2,597,268

UNITED STATES PATENT OFFICE 2,597,268

MACHINE FOR ANGULARLY GUIDING AND MOUNTING TIRES ON WHEELS

William F. Simpson, Louisville, Ky., assignor, by mesne assignments, to Minneapolis-Moline Company, a corporation of Minnesota Application December 19, 1947, Serial No. 792,782

6 Claims. (Cl. 157—1.1)

This invention relates to tire mounting machines and has particular relation to machines for mounting tires on drop center rims.

In the mounting of tires on drop center rims, particularly when the tires are new, it is usually necessary to use a hammer to force the bead over the outer edge of the rim. This treatment is sometimes so harsh that the bead of the tire is injured. This greatly lessen the length of life of the tire; sometimes causing failure at a time when the normal life of the tire should be expected to be much longer.

The primary object of this inventon is the provision of an improved tire mounting machine.

Another object of the invention is the provision of an improved tire mounting machine, wherein the tire is mounted on the rim quickly and with no improper stress being placed on any part of the tire.

A further object of the invention is the provision of an improved tire mounting machine wherein the tire is mounted in two smoothly operating movements.

A still further object of the invention is the provision of an improved tire mounting machine wherein the tire has one side of the bead first placed in the drop center, after which the opposite is moved over the outer side of the rim to complete the mounting.

Still another object of the invention is the provision of an improved tire mounting machine wherein a direct movement, to mounted position, of one side of the periphery of the bead of the tire is brought about, after which the other side of the periphery is then given a relative movement, the result of these movements bringing about the mounting of the tire in a smooth and efficient action without possibility of injury to the tire or tube.

Another and still further object of the invention is the provision of an improved tire mounting machine wherein a lever movement moves one portion of the bead over the rim of the wheel and later, a further movement causes the remainder of the bead to move over the lower rim portion of the wheel to complete the mounting.

Another and still further object of the invention is the provision of a means for causing movement to one portion of the tire bead over the rim of the wheel and a compound movement causes movement of the remainder of the bead over the rim and at the same time moving the first portion of the bead still further to its place.

Another and still further object of the invention is the provision of a moulded guiding means for guiding a tire toward its rim in an off-axial direction with means for moving the tire over the guide and for moving one part onto the rim ahead of the other part.

Other and further objects of the invention will be apparent from a reading of the complete specification.

Referring to the drawings, where I have illustrated embodiments of the invention, Fig. 1 is a perspective view of the invention in an open position ready for use.

Fig. 6 is a view corresponding to Fig. 1 of the power operated machine.

Fig. 7 is a view similar to Fig. 6 with a wheel in place.

Fig. 10 shows the tire on the tire pilot.

Fig. 11 illustrates the position just before the tire mounting operation.

Fig. 14 shows the wheel support and its swinging frame withdrawn.

Fig. 15 is a diagrammatic view of the cylinder connection to the pressure ring.

Fig. 16 is a detail view of the pressure ring.

Fig. 17 is a detail view of a modification.

Similar reference characters refer to the same or similar parts throughout the specification and drawing.

The hand operated modification will first be described.

Figure 1:
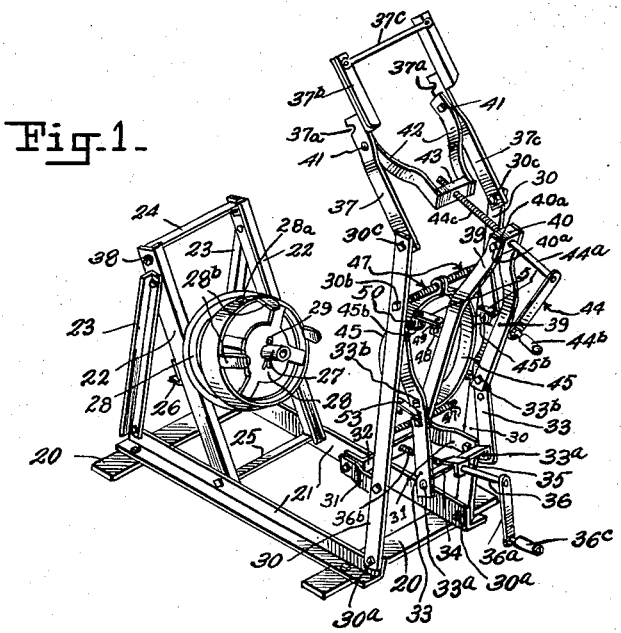

Referring particularly to Fig. 1 where the machine is in the open position, 20 represents two floor strips of the frame upon which the other portions of the frame rest. Extending from one to the other of these strips and connecting them together, are two frame members 21. To the outwardly extending flanges of the angle of the angle members 21 are connected a pair of frame members 22, which with the brace frame members 23, form a rigid rim or wheel holder support, as will be presently described.

The top and bottom of this portion of the frame are braced by the cross brace members 24 and 25.

Across the rear of the frame members 22 is a cross member, in the form of an angle iron 26. To the frame member 26 is fixed the hub spindle 27 on which is detachably mounted the false hub 28. This hub 28 includes a guide or tire pilot 28a for guiding the tire to its place as will be later described.

The tire pilot or guide 28a is in the form of a cylindrical shell having inturned guides 28b at one end, the diameter of the pilot being slightly less than the inside diameter of the tire to be mounted.

Through a suitable hole in the spindle 27 is a securing means in the form of a large cotter pin 29, in place to hold the false hub and guide or tire pilot in place. During the tire mounting action, the foregoing described parts while in part separable, have no relative movement in the tire mounting operation as will later appear.

At the opposite ends of the angle members 21, are pivotally mounted at 30a two main uprights of the swinging frame. These uprights have been designated as 30. Spaced from the bottom of the swinging upright members 30 are pivoted the links 31 which in one form of the invention, extend inwardly toward the spindle 27. Pivoted at the inner ends of the links 31 is a cross member 32 in the center of which is a threaded opening, in one form of the invention, the purpose of which will later be made clear.

Extending downwardly from pivots 30b in the upper portions of the swinging members 30 are lever members 33 which are provided with pivots 33a at their lower ends. Between and mounted on these pivots 33a is a pivoted cross member 34. At the center of this cross member 34 is a bearing 35 in which is mounted to rotate without axial movement, the threaded crank shaft 36 having a crank 36a and a threaded portion 36b. The inner end of the threaded portion 36b is threaded in the threaded opening of the cross member 32, already mentioned.

At the upper end of the swinging members 30 on the pivots 30c are pivoted the locking links 37. These locking links 37 have notches 37a at their ends for engagement with the ends of the bolts 38 located at the tops of the frame members 22. Since the pivoted members 30 swing about the centers of the pivots 30a and the members 37 swing about the centers of the pivots 30c, it is obvious that the notches 37a which are spaced a distance apart equal to the distance between the outer surfaces of the frame members 22, can be made to engage the ends of the bolts 38. When so engaged, the locking links 37 hold the swinging members 30 rigid with the frame as a whole.

Intermediate the ends of the levers 33 are pivots 33b to which are pivotally connected the upwardly extending lever members 39 which are bent inwardly toward each other and are secured to a block 40 at their ends. The block 40 is tiltable on the pivots 40a for a purpose which will later be made clear. Pivoted to the members 37 near the notches 37a at 41 are the ends of the links 42. These links carry at their other ends the block 43 which is rigidly connected thereto.

The block 43 has a threaded opening at its center, the purpose of which will be later described.

The block 40 has at its center a bearing in which is rotatably mounted the shank 44a of a hand crank lever 44. A handle 44b is provided to turn the crank. The end of the shank 44a away from the crank handle is provided with a threaded portion 44c which is threaded in the threaded opening of the block 43 already described.

In order to press the tire shoe over the rim as will later be made clear, there is provided a pressure ring 45. This pressure ring is of the split type and is preferably, though not necessarily, in two parts. At the split ends are two lugs or ears 45a which have openings to receive a spring bolt 46. Surrounding the bolt 46 and on opposite sides of the ears 45a are a pair of springs 47. These springs have a normal tendency to hold the ears 45a together. In the modification illustrated there are two sets of ears 45a, two bolts 46 and two sets of springs 47, these sets being spaced 180° apart, as shown.

The upper portion of the pressure split ring 45 is supported by the mid-portion of the upper pair of levers 39 and the lower portion of the ring 45 is supported by the mid-portion of the lower pair of levers 33 as will now be explained.

About midway of the length of the levers 39 are located a pair of brackets 48. To these brackets are connected loosely, a pair of small angle irons 49. The split ring sections 45 are provided with brackets 45b to which are loosely connected small angle irons 50. Connecting the small angle irons 49, 50 together on the respective sides in a loose manner, are the short links 51. All of these loose connections between the brackets 48 and 45b to the angle irons 49 and 50 and also the connections between the angle irons 49 and 50 with the short link 51 are by loose pivots which will permit of pivotal movement to permit of the necessary adjustment of the parts during the movement of the tire shoe to its place on the rim as will be clear from the subsequent description.

Similarly, there is a lower connection between the lower portion of the pressure ring and the lower pair of levers 33. About midway of the length of the levers 33 are attached loosely, the small angles 52 to which are connected short links 53 whose other respective ends are connected to brackets 45c on the lower portions of the pressure ring 45. The connection of the short links 53 directly to the brackets 45c which are rigidly a part of the ring 45, lends stiffness to the pressure ring sections in a vertical direction.

The locking links 37 are provided with extending portions 37b which are connected together by a handle member 37c. In operation, when it is desired to have the locking links function as such, the handle 37c is grasped by the operative and moved until the notches 37a engage the small bolts 38. In this position, the frame which supports the split pressure ring 45 will be held rigidly relative to the false hub supporting spindle 27.

Having described the many parts of the structure, the operation of the mechanism as a whole will be set forth:

Let us assume the parts to be in position as illustrated in Fig. 1, except that the wheel upon which the tire to be mounted is not on the false hub 28. It is to be also understood that the false hub 28 and the tire pilot 28a are removed from the spindle 27.

The first act in the mounting operation is the placing of the rim or wheel W upon the false hub 28 and the latter with the rim or wheel is then placed on the spindle 27 together with the tire pilot 28a, which is attached to the false hub, the pilot 28a facing toward the split pressure ring 45. The securing means 29 is then put in place in its opening in the spindle. This secures the false hub 28 and the tire pilot 28a in place with the rim or wheel in position to receive the tire. The tire with its tube partially inflated is placed on the guides 28b and guided thereby, and is moved onto the edge of the pilot 28a. A swivel cap with its chain or soft wire cable is attached to the valve stem of the tube and the chain or cable is passed through the valve opening in the wheel rim, in a well known manner. As the rim or wheel is placed on the hub, the valve stem opening is placed in its upper position.

The handle 37c of the locking members 37 is grasped and moved until the notches 27a are in engagement with the small bolts 38, thus holding the swinging uprights 30 in stabilized position relative to the main portions of the frame. The tire and the several parts of the machine are now in position to move the tire onto the rim. Since the particular wheel used has a drop center rim, it is necessary to move the tire to its place in two movements which will now be described.

Figure 2:
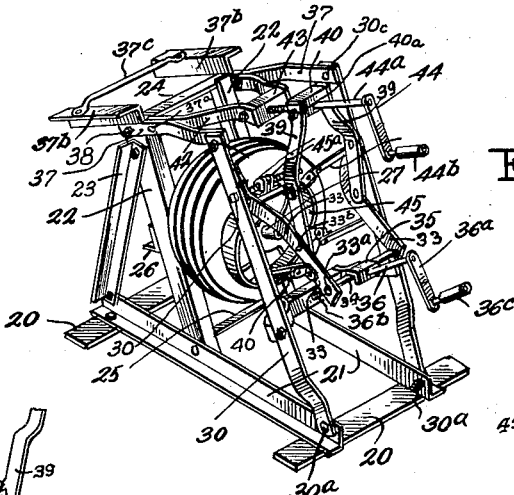
Fig. 2 is a view similar to Fig. 1, but in closed position with the tire ready for mounting.
Figures 2A, 2B:
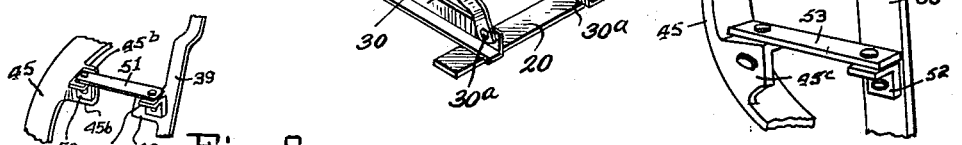
Fig. 2a is a detail view of the upper connection between the pressure ring 45 and the lever 39.
Fig. 2b is a detail view of the lower connection from the pressure ring to the lever 33.
Figure 3:
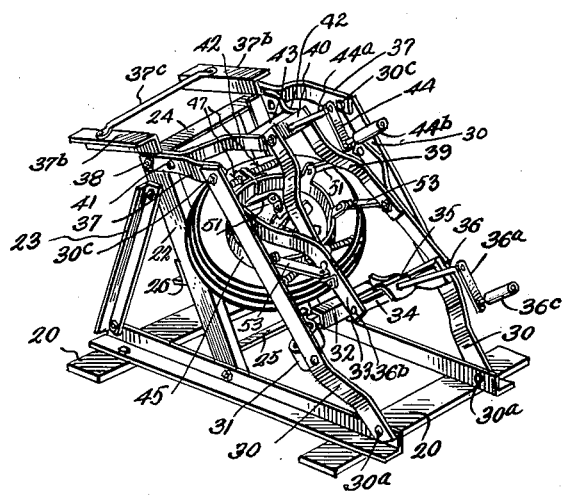
Fig. 3 is a view similar to Fig. 2, after the upper portion of the tire bead has been moved over the upper portion of the rim edge.
Figure 4:
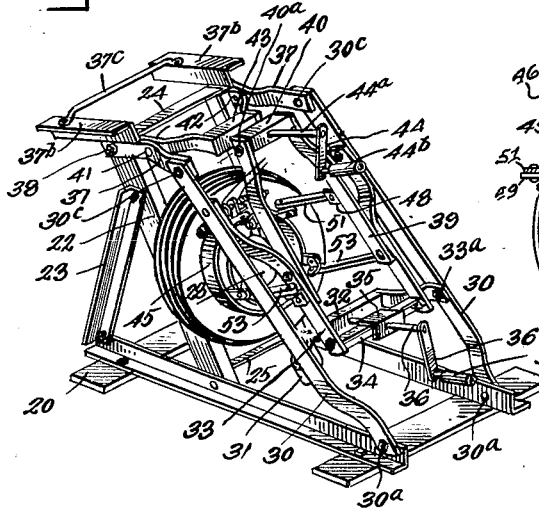
Fig. 4 is a view similar to Fig. 3 but after the lower edge of the tire bead has been moved to its place.
Figure 5:
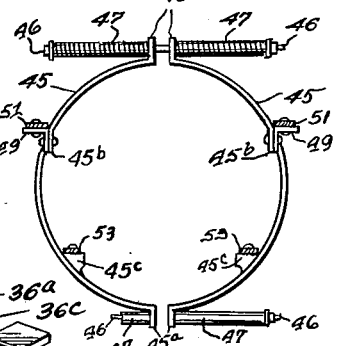
Fig. 5 is a detail view of the split pressure ring.

The moving of the handle 37c to its place ready for placing the tire on the rim, places the parts in position as shown in Fig. 2. It is to be observed that the pressure ring 45 is so supported that when in position to operate as shown in Fig. 2, the ring will be ready to engage the bead of the tire and surrounding the edge of the pilot or guide 28a.

The handle 44b of the crank arm 44 is now grasped and turned clockwise with a right hand thread as illustrated in Fig. 2. This action causes the upper ends of the upper lever members 39 to be drawn toward the tire. This causes the upper portion of the split pressure ring 45 to be forced against the upper half of the bead of the tire with the result that the upper portion of the bead, when forced, moves along the pilot 28a and over the top of the rim of the wheel. After passing the rim, the upper portion of the bead drops into the drop center of the wheel. It is to be understood that while this forcing of the bead over the upper half of the rim is taking place, the pressure ring 45 will be forced over the pilot guides 28b and the main body of the pilot 28a. During this movement, the split of the ring separates in order to allow for the difference in size of the outer periphery of the pilot 28a and the inner periphery of the pressure ring 45. At this time, the springs 47 tend to compress the pressure ring, at the same time allowing it to pass over the guide or pilot 28a.

As soon as the upper portion of the bead of the tire shoe is in the drop center portion of the wheel, the parts are in position to move the lower portion of the bead under the lower portion of the rim of the wheel to complete the mounting of the tire on the wheel. This is brought about by the turning of the lower hand crank 36a. This crank is turned in a similar manner already described for the upper crank member 44 with the result that the lower ends of the lower levers 33 are brought in toward the tire. While the movement of the upper level members 39 by the crank handle 44 causes a simple lever movement, the movement of the crank 36a when constructed, as illustrated, causes a compound movement to affect the upper portion of the pressure ring 45 as well as its lower portion.

The movement of the lower ends of the lever members 33 causes a movement of the lower side of the pressure ring 45 because of the connections 53 between the lower portion of the ring 45 and the central portion of the lever member 33. At the same time, a compound action is brought about by the fact that the lower pivots of the upper lever members 39 are intermediate the ends of the respective lower levers 33. Consequently, as the lower ends of the lever members 33 move to force the lower portion of the bead to its proper place, a further movement of the lever members 39 but to a lesser degree, is caused to take place with the result that a limited movement of the upper portion of the pressure ring 45 will take place. The crank 36a is rotated until the tire is in place on the rim. The handles 36c and 44b are then turned to their previous positions and the handle member 37c lifted to withdraw the pressure ring from the tire, to the position illustrated in Fig. 1.

The securing means 29 may now be removed and the false hub and pilot withdrawn to liberate the wheel and mounted tire. The chain or soft woven wire cable protruding from the valve stem opening in the wheel is now pulled to draw the valve stem out therethrough.

The tire is now shaken or bumped on the floor or ground to cause the tube within the tire shoe to adjust itself to permit of a proper inflation. The tire may now be inflated. With some types of tubes, the tire may be inflated while still on the false hub 28. After inflation, it is deflated and again inflated, after which it is ready for use.

It is to be understood that in a machine of this kind, different sizes of pressure rings 45 and different sizes of false hubs 28 and tire pilots 28a would be necessary to accommodate the different sizes of tires on the many types of automotive equipment.

In the specification and claims the term rim is used. It is not to be construed to mean exclusively a rim which is separate from the wheel or one which is a part of a detachable wheel, but is intended to include both.

In referring to the tire it is to be understood that the shoe or ground contacting portion of the whole tire is meant, although in operation, the inner lining or tube may be present within the outer shoe or tire, during the mounting operation.

The power operated modification of the invention will now be described.

The cross strips 60 are placed at the ends of a frame and connect the two long frame members 61 together. These frame members 61 support the working parts of the tire-mounting machine.

Slidably mounted on the frame members 61 is a movable frame having base members 62 which slide longitudinally of and are supported on the frame members 61. Suitable uprights 63 with the base members 62, form triangular frames and with cross members 64 and brace members 65 provide a superstructure on the frame members 62. Pivotally mounted to swing on the inner members 63 and on the inner sides thereof are the swinging members 66 which are connected together by the cross members 67 and 68.

At a substantially central position there is provided a cross member 69 (see Figs. 8, 9), at the center of which is a threaded opening in which is threaded a hand screw 70 having a T-shaped handle. Concentric with the hand screw 70 and secured to the swinging members 66, is a wheel support 71 which is, as illustrated, in the form of a solid ring of a size to receive the wheel or rim, thereon, as will be later described.

Pivotally mounted on the frame members 61 about the center 72, is a bell crank 73. There are provided a pair of arms or handles 73a. A bell crank arm 73b forms a part of the bell crank lever 73 and is pivoted as at 73c to the operating rods 74. The forward ends of the operating rods 74, are pivotally connected as at 74a to the forward frame members 63. It will be evident from this construction that when the arms or handles 73a are swung in one direction, the frame members 62 and the parts carried thereby will be moved along the frame members 61 in one direction and when the handles 73a are moved in the opposite direction, the frame members 62 will move along the frame members 61 in the opposite direction.

Connected to the sides of the swinging frame members 66, respectively, are two locking-toggle links 75 which are pivotally connected to two other complementary locking links 76, the latter being pivotally mounted as at 76a on the rear frame members 63.

When the links 76 are swung to their rear or outer positions, the swinging frame members 66 will lie close to the inner frame members 63 and when the toggle links 76 are swung to the inner or forward positions, the swinging frame members will be swung to a position away from the inner frame members 63. When the locking-toggle links are in their extended positions, they are held from going too far by any suitable stop means.

The foregoing structure is primarily for taking care of operations preliminary to the mounting of the tire and not in the actual mounting of the tire. But by the operation of the handles 73a, a movable frame which carries the tire or wheel support 71 can be moved so as to bring the wheel support 71 to a position to coact with the mounting devices as will be later described.

On the opposite ends of the longitudinal frame members 61 is mounted the mechanism whereby the tire is placed on the wheel or rim. This part of the invention will now be described.

Stationary with relation to the longitudinal frame members 61 is a box frame having inner uprights 77 and outer uprights 78. Suitable horizontal connecting frame members 79a, 79b, 79c and diagonal braces 80 serve to complete the substantial box frame.

Pivotally secured at their upper ends to the horizontal frame members 79b, as at 81a, are the lever members 81 which at their lower ends are bent inwardly toward each other and are connected to the plunger of a fluid power cylinder 82. Pivotally secured at their lower ends to the levers 81, as at 81b, are respectively connected the shorter levers 83 which are bent toward each other and are pivotally connected at their upper ends as at 83a to the plunger of a fluid power cylinder 84. (See Fig. 15.)

Connected by pivots 81c intermediate the ends of the levers 81, are ends of respective lower push rods 85. The opposite ends of these push rods 85 are connected to the lower portion of a split pressure ring 86, as at 86c which is here illustrated, although not necessarily, as having two splits—at top and bottom as at 86b.

Intermediate the ends of the respective levers 83 are pivotally connected the ends of each of two upper push rods 87. These push rods 87 have their other ends connected to the upper portion of the split ring 86, as at 86d. The ends of the push rods 85 and 87 are preferably substantially equally spaced throughout the circumference of the split ring 86.

The split ring 86 is provided with eyelet members 86a which receive the ends of guide members 88, one of each of which is fixedly secured to an upright member 77. The split ring, as illustrated, has two ears 86b adjacent the upper and lower splits. These ears are provided with holes to receive the spring bolts 89 which carry the springs 90.

The springs 90 are normally under tension and tend to keep the two adjacent ears 86b in close contact with each other except during the tire-mounting operation to be later described. It is to be understood that during the tire-mounting operation, when the pressure ring 86 is pushed toward the tire, as will be described, the eyelets 86a leave the guide members 88 and are returned when the plungers of the fluid pressure cylinders 82 and 84 again withdraw the split ring 86 from its mounting position.

The cylinders 82 and 84 may be controlled by a valve 91 which may be a four-way valve which opens first to one side of the cylinder 82 and then to one side of the cylinder 84 or may be a usual two-way valve, opening one side of each of the cylinders 82 and 84 to the fluid pressure at the same time. The two-way valve may be made possible in any one of different ways. The opening to the cylinder 82 may be made smaller or the proportions of the arms of the levers 81 and 83 may be such that the plunger of the cylinder 82 has to travel a longer distance to effect its function.

The tire pilot or guide 92 is of an irregular form and has its axis at an angle to the axis of the face 92a where the rim or wheel contacts to receive the tire.

The tire pilot or guide is so formed that as the tire is forced over its surface on its way to its position on the rim or wheel, the tire will not bind on the surface of the pilot, the particular cross-section at the line of contact of the tire at any particular time, will be substantially circular and of slightly less diameter than the diameter of the tire at the inside of the bead. The guide or pilot 92 is in the form of an irregular cylinder having axis ends which are offset from each other, with cross sections along the travel of the tire, substantially circular and slightly smaller than the inside tire diameter of the tire for which it is designed. As will appear in the description of the operation of the forms herein described, the tire top is pushed forward during the first part of the mounting movement, the bottom being forced forward only after the top portion of the tire has passed over the near end of the rim. With this construction and the operation to be described, the tire can be easily forced over the guide or pilot to its place on the rim or wheel. The tire pilot or guide may be made of any suitable material.

It is to be noted that the tire guide or pilot 92 fits snugly into the split ring 86. When so placed, it is desired to have it held in position until it is to be released. To carry out this desire, there is provided a bell crank lever 93 which is pivoted to the frame members 77 as at 93a. Extending from the shaft of the bell crank lever 93 is a swinging arm 93b. (See Fig. 9.) On this arm 93b is a latch, upwardly extending, as at 93c and in position to engage a complementary member within the pilot or guide 92 which is engaged by the latch when the latter is in its upper position. When however, the lever 93 is moved toward the tire pilot or guide 92, the latch 93c will be lowered and the guide is released for a purpose to be made clear in the description of the operation. It is to be understood that the guide or pilot 92 should be put in position in preparation for the mounting operation in the position for which it was designed, so that the split pressure ring will cooperate with its outer surface and move the tire to its proper position on the rim or wheel.

The operation of the tire mounting machine as a whole will now be described.

While the sequence of steps in putting the parts in place and the arrangement of the parts preparatory to the mounting operation, may be varied, one method of assembly of the parts and of the steps in the mounting will be described in detail. Figures 6 to 11, inclusive, show the preferred order of steps for assembling the pilot, tire and wheel prior to the mounting. Some of the steps shown may appear to be unnecessary and as a matter of fact can be eliminated in arriving at the assembly shown in Fig. 11. However, it is found that the tire and wheel are more accurately and speedily brought to the proper relative positions and the least manual effort is expended with carrying out the complete sequence of steps as shown and hereinafter described.

Figure 8:
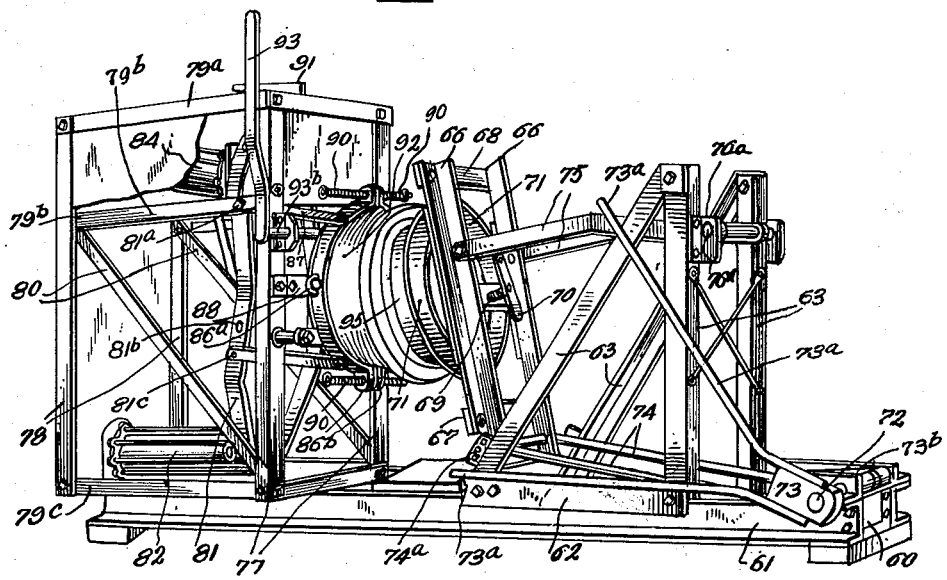
Fig. 8 is a view showing the wheel and pilot together.

Figure 6 shows the parts in the preparatory position ready for the start of the tire mounting operation, it being assumed that the tire pilot or guide 92, the pressure ring 86 and the wheel support 71 are all of a size and shape appropriate to the size and shape of the rim or wheel upon which the tire is to be mounted. The wheel or rim 95 is manually, or by means of some suitable supporting device, placed and held against the face 92a of the pilot or guide 92 and concentric therewith, care being taken to see that the valve stem opening in the rim is at the top. With the parts shown in the positions of Fig. 7, the operator moves the lever arms 73a over to the left, as illustrated. (See Fig. 8.) This action causes the arms 73b to force the operating rods 74 to the left, causing the whole carriage which is mounted on the base members 62 to slide along the frame members 61. When the lever arms 73a reach their left hand position, as shown in Fig. 8, the swinging frame 66, 67, 68 is moved to the left, locking the toggle links 75 and 76 in extended position. The hand screw 70 with its T-shaped handle is now turned to cause its threaded portion to engage the complementary opening 92b, shown in Fig. 6. The threaded hand screw 70 is turned until the cross member 69 is securely held to the pilot or guide member 92.

Figure 9:
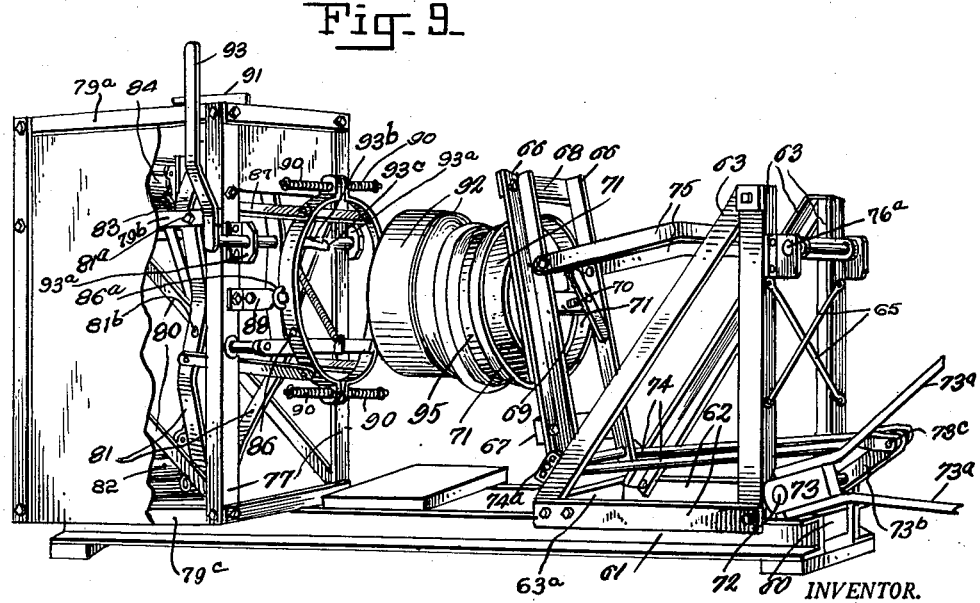
Fig. 9 is a view showing the pilot withdrawn from the pressure ring.

The lever 93 is now moved clockwise. The latch 93c is caused to move to released position with relation to the pilot or guide 92. Since the pilot or guide member 92 is held to the swinging frame 66, 67, 68, it follows that if the lever handles 73a are again swung to the right, the whole frame construction which is supported on the base members 63 will move to the right carrying with it the pilot or guide member 92. The separation of the pilot or guide member 92 from the split pressure ring 86 is made possible due to the fact that the pilot or guide member 92 is slightly less in cross section at any time of contact with the split pressure ring 86. When thus withdrawn, from the pressure ring 86, the pilot or guide member 92, assumes the position as illustrated in Fig. 9.

Figure 12:
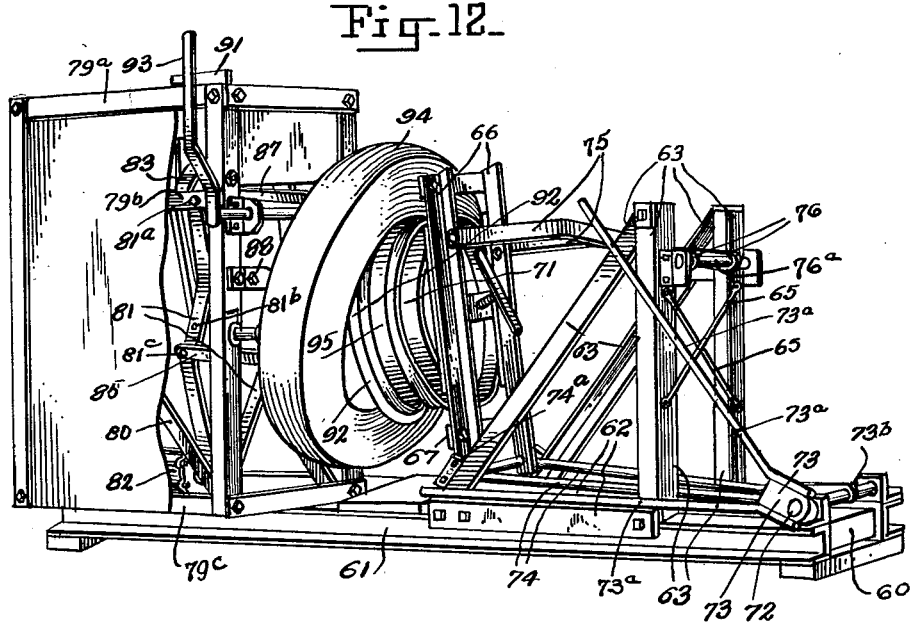
Fig. 12 illustrates the position at the end of the first movement.
Figure 13:
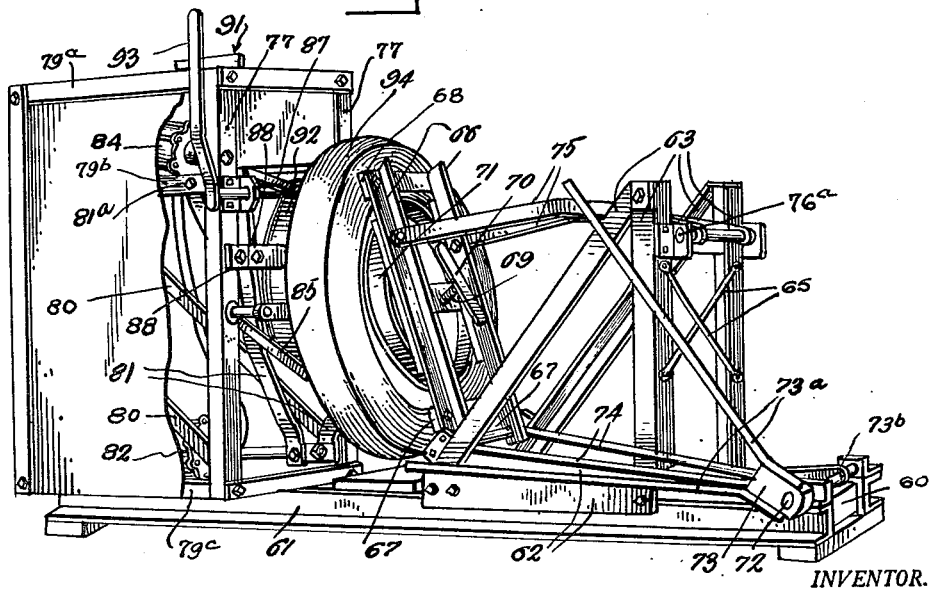
Fig. 13 shows the mounting completed.

The tire 94 is now taken and placed on the end of the pilot or guide member 92 adjacent the split pressure ring 86, care being taken to place the valve stem of the tube uppermost, the valve stem pulling-chain being passed through the valve stem opening in the rim or wheel, in a well-known manner. The several parts at this stage of the mounting operation are as shown in Fig. 10. The lever handles or arms 73a are now again swung to the left, as illustrated, and the frame 66, 67, 68 will be moved so that the end of the pilot or guide 92 will again enter the pressure ring 86. The lever 93, having been returned to its normal position, will have brought the latch 93c to a position where it will again hold the pilot or guide 92 as the latter reaches the limit of its movement just described. It will now be apparent that the swinging frame 66, 67, 68 and the parts supported thereby, and the frame members which support the split pressure ring 86 will each be held rigid with relation to each other. The parts are now in the respective positions as illustrated in Fig. 11. It may appear that this assembling operation could be simplified by placing the tire over the forward end of the guide and then the wheel on the guide prior to movement of support 71 carrying the frame to the left for guide connection of screw 70. It is found, however, that with the tire loosely disposed around the inclined portion of the guide, it is difficult to hold the tire and wheel in proper relative positions during the connecting step. There is also the possibility of attaching the wheel and pilot 92 directly to the swinging frame as shown in Fig. 9. To do this, however, the guide 92 would obviously have to be supported manually or otherwise at least temporarily while hand screw 70 is operated. I have accordingly found that as a practical matter the units are assembled with more ease and accuracy by following the steps as shown. The valve 91 is now operated to admit fluid pressure to the upper cylinder 84. The plunger of this cylinder 84 moves the upper end of the short lever 83 which in turn moves the upper portion of the split pressure ring 86 toward the tire. As the split pressure ring 86 passes over the surface of the pilot or guide 92, it is eased by the springs 90. At the end of the movement caused by the activation of the upper cylinder 84, the upper portion of the tire 94 will pass over the top of the rim 95 and into the drop center of the rim or wheel 95. The parts are now in positions as shown in Fig. 12. Further movement of the valve operating lever 91, opens the lower cylinder 82 to fluid pressure. The plunger of this cylinder 82 forces the lower end of the long lever 81 outwardly. This has a direct action on the lower portion of the pressure ring 86 in forcing that portion of the ring over the surface of the pilot or guide member 92 to push the lower portion of the bead of the tire over the rim to its place. At the same time, there is a secondary action in that the movement of the long lever 81 swings the lower end of the upper lever 83, to which it is pivotally attached at 81b. This movement caused by the activation of the cylinder 82, completes the movement of the tire over the rim or wheel and the tire is now in place. The valve stem pulling chain is now utilized to pull the valve stem through the valve stem opening in the rim or wheel 95. The completely mounted wheel or rim, before it is removed from the machine, is shown in Fig. 13.

By reversing the turning of the hand screw 70, the pilot or guide member 92 may be released from the wheel support 71 and the toggle composed of the members 75 and 76 may be broken and the swinging frame 66, 67, 68 moved backwardly toward the inner frame members 63, leaving the mounted tire and wheel or rim 95 where it may be inflated or removed for later inflation, at the will of the operative. This is illustrated in Fig. 14.

In Fig. 17 there is illustrated a modification of the means for moving the carriage supported on the base members 62. In this form, the bell crank lever 73 and its handles 73a, the bell crank arms 73b and the operating rods 74 are omitted and in place thereof and to perform the same function, there is provided a fluid pressure cylinder 96 which is rigidly mounted on the frame members 61 and having a plunger 96a pivotally connected to the sliding carriage as to the cross members 63a at 63b. The cylinder 96 has its ends hydraulically connected to a control valve 97 which is conveniently located as adjacent the valve 91. When it is desired to move the wheel support 71 to a position adjacent the pilot or guide member 92 it is only necessary to open the valve 97 to activate the plunger of the fluid pressure cylinder 96. The plunger 96a will force the whole carriage which is carried by the base members 62 toward the pilot or guide member 92 after which the pressure is maintained until it is desired to return it to its normal out of operation position. To bring this about, the valve 97 is operated to apply the fluid pressure to the opposite end of the fluid pressure cylinder 96 which will cause the reverse action. With the construction shown in Fig. 17, the operation of the swinging frame members 68 and their toggle members 75 and 76 is the same as has already been described.

While modifications of the invention have been illustrated and described in detail, it is to be understood that the disclosures are merely illustrative and that many modifications and changes may be apparent to and made by persons skilled in the art without departing from the spirit of the invention and within its scope as claimed.

Having described the invention, what is claimed is:

1. A tire mounting machine comprising a rim holding means, a guiding means with an offset end portion for guiding a tire at an angle, a lever means for moving one portion of the bead of a tire over the guiding means and rim while holding another portion of the tire substantially without movement toward the rim and a second lever and connections for moving the remainder of the tire over the guiding means and rim and including a connection to the first lever means for giving a lesser movement to the portion of the bead first moved and a single lever for controlling the consecutive movements.

2. A tire mounting machine comprising a rim holding means, a guiding means with an offset end portion for guiding a tire at an angle, means for moving one portion of the bead of a tire over the guiding means and rim and a second means for moving the other portion of the rim and including a connection to the first moving means for giving a lesser movement at the same time to the first portion of the tire moved.

3. A tire mounting machine comprising a rim holding means, a guiding means with an offset portion for contacting a tire bead and for supporting and guiding a tire at an angle, an expansible means for coaction with the pilot and for contact with the bead of a tire, means for moving one side of the expansible means against the bead of a tire to cause the same to move over the rim and a second means for moving the other side of the expansible means to move the remainder of the tire over the rim, while the first portion is held in place.

4. A tire mounting machine comprising a main frame, a rim holding means supported thereby, a guiding means with an offset portion for contacting a tire bead and for supporting and guiding a tire at an angle to a point adjacent the rim holding means, a swinging frame moveably supported on the first named frame, means for holding the swinging frame in fixed relation to the main frame at the will of the operator, means for connecting the swinging frame to the guiding means, an expansible means carried by one of the frames and in position to engage the bead of a tire being mounted when the swinging frame is in held position, means for causing one portion of the expansible means to move a portion of the bead of the tire to its place beyond the edge of the rim and for causing the opposite portion of the expansible means to move the remainder of the bead to its place beyond its corresponding portion of the rim while the first mentioned bead portion is held in its moved position.

5. A tire mounting machine comprising a rim holding means, a guiding means with an offset end portion for guiding a tire at an angle onto the rim and means for successively moving one portion and then the other portion of the edge of the bead of the tire onto the rim and including a single lever for controlling the movement.

6. A tire mounting machine comprising a rim holding means, a guiding means with an offset end portion for guiding a tire at an angle onto the rim and means for successively moving one portion and then the other portion of the edge of the bead of the tire onto the rim.

WILLIAM F. SIMPSON.

REFERENCES CITED

The following references are of record in the file of this patent:

UNITED STATES PATENTS

| Number | Name | Date |
|---|---|---|
| 1,113,133 | Miner | Oct. 6, 1914 |
| 1,124,316 | Pfleumer | Jan. 12, 1915 |
| 1,377,343 | Hardy | May 10, 1921 |
| 1,437,085 | Banta | Nov. 28, 1922 |
| 2,473,571 | Cook | June 21, 1949 |
| 2,519,114 | Compton | Aug. 15, 1950 |

FOREIGN PATENTS

| Number | Country | Date |
|---|---|---|
| 86,670 | Switzerland | Feb. 16, 1921 |
| 624,204 | France | July 11, 1927 |
| 720,878 | France | Feb. 25, 1932 |